UNITED STATES PATENT OFFICE.

HAROLD S. ASHENHURST, OF CHICAGO, ILLINOIS, ASSIGNOR OF ONE-HALF TO JOSEPH D. HUBBARD, OF CHICAGO, ILLINOIS.

ASBESTOS CEMENT.

1,317,853.  Specification of Letters Patent.  Patented Oct. 7, 1919.

No Drawing.  Application filed November 18, 1918. Serial No. 262,954.

*To all whom it may concern:*

Be it known that I, HAROLD S. ASHENHURST, a citizen of the United States, and resident of Chicago, in the county of Cook and State of Illinois, have invented certain new and useful Improvements in an Asbestos Cement, of which the following is a specification.

My invention relates to a new composition of matter and particularly to a novel asbestos cement.

A material having cementitious qualities and adapted to resist a high degree of heat is required for many purposes. Fiber asbestos in association with a suitable binder has been commonly employed for this purpose, but the cost of the necessary long fiber asbestos is rapidly increasing with the result that the cement is relatively expensive. Furthermore, a cement of this character is heavy in comparison with the product herein claimed.

One of the important objections to the asbestos cements now in use is their tendency to crack after having become set or during the process of setting. In the cements at present in use commercially, the major constituent is clay, a quantity of fibrous asbestos being mixed therewith as a binder. When water is combined with this substance there is a degree of coherence but no reaction between the different elements of the mixture.

One of the objects of my improvement is to provide an asbestos cement containing no added substance intended to act as a binder, the elements going to make up the asbestos and with which the asbestos fibers are associated reacting with water to form a silicious binder by means of which the minute asbestos particles are bound together to an extent sufficient to produce an admirable cement.

A further important object is to utilize in the production of this substance a material which has heretofore been considered waste; in other words, the waste asbestos sand which forms the residue from asbestos mills. This substance has heretofore been considered useless. Numerous attempts have been made to utilize the same in some manner by grinding or separating the asbestos fibers without result. No one has conceived it possible to produce a material having any cementitious qualities from this material. I have found, however, that when properly prepared to insure a product in which the particles are of the correct size and shape, the material constitutes the most desirable asbestos cement now known. It is light, and when combined with the proper proportion of water, is very plastic, has a relatively great covering capacity, adheres firmly, and, most important of all, does not shrink or crack when dried. Furthermore, in view of the character of the structure of the mass it has a very high efficiency as a non-conductor of heat; in fact, an efficiency several times greater than those cements in which clay is incorporated as the principal ingredient. The reason for this will be readily understood as in its final form the mass is made up of the minute crystallized, interlocked fibers and a multitude of interstices or voids.

Considering the substance from a technical standpoint based on exhaustive chemical and microsopic analysis, it may be described as follows:

The substance from which the final product is secured is in the form of finely divided particles of a dense greenish-gray mass composed mainly of a hydrated double silicate of magnesium and calcium, carrying in mechanical mixture the finely divided particles of chromic and magnetic iron together with quantities of the matrix rock. The product presents a brilliant deep green surface by reflected light, is harsh to the touch and gritty when placed between the teeth. In the process of manufacture which is described in my co-pending application filed of even date herewith, the substance which is described is placed in a ball mill or similar grinding device and treated for such length of time that substantially $66\frac{2}{3}\%$ of the substance will fail to pass through a screen of nine hundred meshes per square inch. It is then passed over vibrated screens of the size specified. The product carried over by the screen is then delivered to a blower by means of which it is raised to a considerable height, passes through a dust separator whereby any entrapped dust particles are removed. It is then allowed to freely fall by gravity in an inclosed space. The fineness of grinding and the size of the screen should be so correlated as to produce a substance having a weight of approximately twenty-five pounds per cubic foot. A materially lighter or materially heavier product will not act in the manner described or constitute a desirable cement. The reason for this is not that the weight has anything to do with the matter except as a commercial consideration, but for the reason that a product having this weight and prepared in the manner described will contain the necessary coöperating elements to insure the final result; that is to say, the particles going to make up the mass must be so finely divided as to present sufficient area of exposure to the action of the water to release the required soluble silicates and the particles must not be so finely divided as to destroy the fibers which serve to bind the mass together. It must not be assumed from this that the adhesive effect is secured because of mechanical engagement of the particles. The effect is secured because of the fact that the fibers are more or less interlocked, over-lapped and intermeshed and the cementitious substance which serves as a binder acts only at the intersections or junctions of these fibers there being an insufficient quantity of the adhesive to fill all the interstices or spaces between adjacent fibers.

It will be understood that the weight specified herein is that of the material immediately after the completion of the steps incident to its production, and this weight may vary somewhat without injuriously affecting the final product. However, after the material has been jolted and shaken as in shipping, it becomes more packed and compressed and the weight per cubic foot will substantially increase. This will not lessen its value as its action following the addition of water will be the same and its final weight will be substantially the same as though the lighter product had been used.

The product resulting from the process described is a nearly white, fluffy mass, softly fibrous to the touch and entirely free from gritty particles even when viewed under a microscope. The majority of the particles are in the form of monoclinic crystals which cannot be mechanically bound together or felted. Chemical analysis proves this product to be a double silicate of magnesium and calcium containing appreciable quantities of alkaline silicates. When water is added to such a product the soluble silicates pass into solution and this solution filters in between the fibers. These alkaline silicates are very weakly basic and the silica therein may be displaced by as weak an acid as carbon dioxid. Since the air and possibly the water contains considerable quantities of this acid, the silica in the aqueous solution is displaced from its salts and free silicic acid is precipitated acting as a binder and serving to cement the fibers at their intersections.

The acid before precipitation is presumably the metasilicic; assuming the solution to contain the sodium salt, the reaction proceeds as follows:

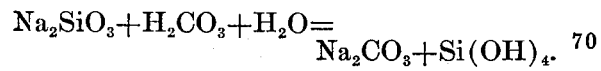

$$Na_2SiO_3 + H_2CO_3 + H_2O = Na_2CO_3 + Si(OH)_4.$$

On heating the gelatinous precipitate of silicic acid, or after the mass has dried, it contains a smaller proportion of the elements of water and the reaction proceeds as follows:

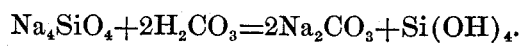

$$Na_4SiO_4 + 2H_2CO_3 = 2Na_2CO_3 + Si(OH)_4.$$

Further heating or drying over a protracted period results in the formation of silicon dioxid, which is the final product.

$$Si(OH)_4 = SiO_2 + 2H_2O.$$

Thus it will be seen that while there is no substance added to the original product in order to secure the desired result, there is a nicety of size and disposition of the fibers which makes the final result possible. The step of aerating the product is found to be highly desirable, if not essential, as it serves to individualize the fiber products and to break up any matted aggregates of fiber and entrapped rock particles.

It must be borne in mind that while the product herein described is capable of being very cheaply produced and presents novel inherent features because of peculiar reactions, it has features of practical utility which make it preëminent above all others. It has higher efficiency as a non-conductor; it has greater plasticity and covering capacity; it is lighter and can be manipulated with greater ease than other like cements, and it does not shrink or crack.

I claim:

1. An asbestos cement composed of finely divided particles of the double silicate of magnesium and calcium, having a weight of approximately twenty-five pounds per cubic foot, substantially as described.

2. A cementitious substance having a weight of approximately twenty-five pounds per cubic foot, composed of finely divided magnesium silicate, and a soluble silicate, substantially as described.

3. An asbestos cement composed of the double silicate of magnesium and calcium in a finely divided condition and containing an appreciable amount of a weakly alkaline, water soluble silicate, substantially as described.

4. A fire resisting cementitious substance having a weight approximating twenty-five pounds per cubic foot and composed of that portion of finely divided asbestos sand which will pass over a 900 mesh screen, the product containing a weakly alkaline, water soluble silicate, substantially as described.

5. An asbestos product composed of the double silicate of magnesium and calcium and a water soluble silicate, the substance being sufficiently finely divided whereby on the addition of water sufficient of the soluble silicate is released to react with carbondioxid to form a silica binder for the adjacent particles, substantially as described.

6. As a new composition of matter, that portion of ground asbestos sand which will pass over a substantially 900 mesh screen and will weigh substantially twenty-five pounds per cubic foot and which has been aerated to individualize the particles, substantially as described.

Signed at Chicago, Ill., this 14th day of November, 1918.

HAROLD S. ASHENHURST.

Witness:
T. D. BUTLER.

Copies of this patent may be obtained for five cents each, by addressing the "Commissioner of Patents, Washington, D. C."